UNITED STATES PATENT OFFICE.

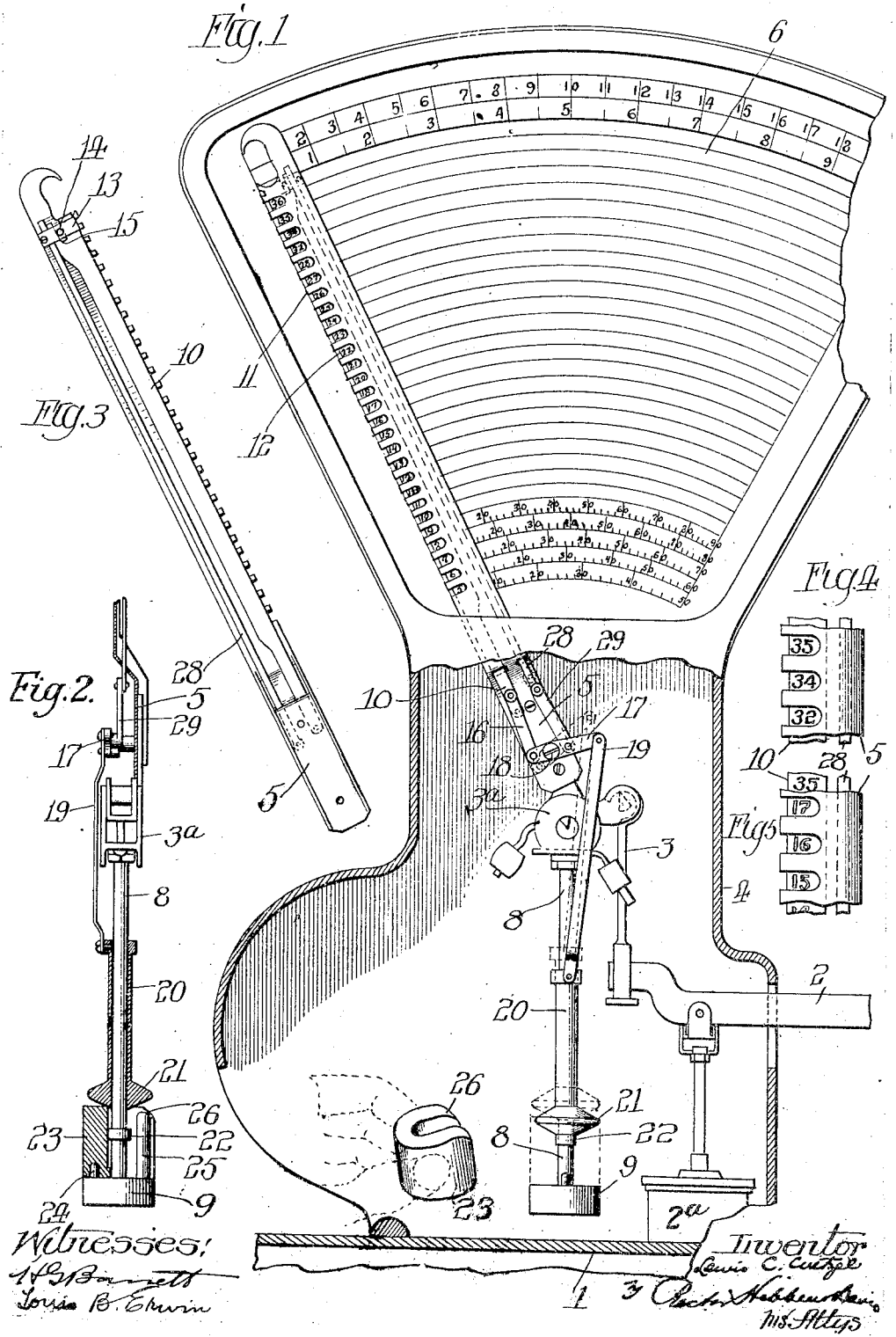

LEWIS C. WETZEL, OF TOLEDO, OHIO, ASSIGNOR TO TOLEDO COMPUTING SCALE COMPANY, OF TOLEDO, OHIO, A CORPORATION OF NEW JERSEY.

COMPUTING-SCALE.

938,096. Specification of Letters Patent. Patented Oct. 26, 1909.

Application filed February 7, 1907. Serial No. 356,216.

*To all whom it may concern:*

Be it known that I, LEWIS C. WETZEL, residing at Toledo, in the county of Lucas and State of Ohio, have invented certain new and useful Improvements in Computing-Scales, of which the following is a specification.

In computing scales of the pendulum variety it is customary to provide for augmenting the weight of the pendulum so as to increase the weighing capacity of the scales at will and in order to adapt the chart and index hand to either normal or augmented capacity it has been customary to provide two rows of weight numerals on the chart, one made up of twice as many numerals as the other, and to inscribe upon the face of the index hand two parallel rows of price numerals, each numeral of one row being paired with a numeral of twice the value in the other row. Contrasting colors are generally employed to distinguish the two rows of weight numerals from each other and the two rows of price numerals from each other. The price row representing lesser values is of course used in conjunction with the row of weight numerals representing the augmented weighing capacity of the scales and these two co-operating rows of numerals have the same color while the contrasting color is used for the row of price numerals representing the greater values and for the row of weight numerals representing the lesser or normal weight capacity of the scales. The means for augmenting the counter-balancing properties of the pendulum generally takes the form of a ball weight which may be readily applied to and removed from the pendulum and it is customary to give this ball weight the same color as the row of lesser price numerals and the row of greater capacity weight numerals. Thus when the ball weight is on the pendulum its color is that of the price and weight numerals which are to govern in reading the scales. This simple color system has been found to fully satisfy all reasonable requirements in the matter of denoting how the scales shall be read when used at one weight capacity or the other. However, in order to remove any possibility of confusion in the use of the scales by inexperienced or unusually stupid or designing persons it has heretofore been proposed to provide for displaying only the row or set of price numerals of the greater values when the extra weight is off the pendulum and to display only the row or set of numerals of the lesser values when such weight is on the pendulum, thus rendering it impossible for the user to ignore the price numerals whose color alone should suffice to indicate how the scales are to be read. This broad idea is not of the present invention which relates rather to a different way of carrying out the idea than as heretofore done. Thus the present invention aims to provide for shifting the price numerals by the act of placing the weight upon or of removing the same from the pendulum without regard to any mechanism for so handling the weight, the latter itself directly controlling the shiftable devices. In furtherance of this purpose the latter devices are all mounted upon and carried by the pendulum and the index hand and so the user of the scales does not have to concern himself as to any particular disposition of the pendulum or the index hand as pre-requisite to the placing of the weight upon or its removal from the pendulum.

The drawings which accompany and form part of this specification illustrate one form of means for carrying out the above-stated object which may, however, be carried out in other ways without necessarily departing from the scope of the invention.

Of said drawings Figure 1 represents part of a computing scale of a well-known type with the present invention applied thereto, this view being for the most part a front elevation though parts of the casing appear in section on account of this casing being broken away. In this figure of the drawings full lines represent parts as positioned under what may be termed normal conditions, that is without additional weight on the pendulum, and dotted lines represent the changed relation of parts resulting from the application of the removable weight to the pendulum. The so-called ball weight is represented in this view in perspective as though about to be placed upon the pendulum. Fig. 2 represents a vertical sectional view of the pendulum and part of the index hand together with the devices for shifting the price numerals, the removable weight being in position upon the pendulum; Fig. 3 is a rear elevation of the index hand; and Figs. 4 and 5 are fragmentary front elevations of the index hand illustrating the display of price numerals when the removable weight is off and when it is on the pendulum.

The particular type of computing scales to which the invention is shown as applied is that disclosed in De Vilbiss reissue Patent No. 12,029, dated September 9, 1902, and this patent may be consulted so far as the details of construction and particular mode of operation of this type of scales may be concerned. It will suffice for the purposes of the present specification to briefly designate certain familiar features of this type of scales. Above a suitable supporting base 1 a scale-beam 2 is arranged in the usual manner, said scale-beam entering a housing 4 and being connected with a dash pot 2ª and through the medium of a link 3 with a pivot-piece 3ª to which on the upper side of the pivot there is rigidly secured an index hand 5 and to which on the lower side of the pivot is rigidly secured the stem 8 of a pendulum having a permanently attached weight 9 at its lower end. The index hand as usual extends radially over a chart 6 within a flaring or fan-shaped upper portion of the casing or housing, said chart being made up of concentric rows of computation numerals and two outer rows of weight numerals and the index hand being adapted as the pendulum swings to sweep over this chart. It has been customary to inscribe upon the front of such an index hand two vertically extending parallel rows or sets of numerals indicating prices per pound of commodities to be weighed upon the scales and to use one column or the other of such numerals according as the ball weight is on or off the pendulum as already explained at the outset of this specification.

In the present instance the index hand itself does not bear such two rows or sets of price numerals but the latter are inscribed upon a strip or bar 10 which is arranged to slide upon the rear side of the index hand. The set of numerals to be consulted when the ball weight is off the pendulum do not follow one after another in a vertical row but alternate with the price-numerals which are to be consulted when the ball weight is on the pendulum. The index hand is constructed as usual with a series of fingers 11 one for each of the concentric rows of computation numerals on the chart and in the present instance these fingers are made of such length and so spaced apart as to provide intervening openings 12 of sufficient dimensions to expose to view either of the sets of price numerals but not both, one set being completely hidden by the fingers themselves when the other set is exposed in these openings. The bar 10 is confined at its upper end by a keeper 13 secured on the back of the index hand as shown in Fig. 3, one of the securing screws 14 passing through a slot 15 in the bar to properly measure the extent of movement of the latter. At its lower end the bar extends through a slot in an offset portion of the index hand as clearly shown in Fig. 2 and at its lower extremity is jointed to a link 16 which is in turn jointed to one end of a lever 17, the latter being pivoted intermediate its ends to the index hand as shown at 18. To the opposite end of this lever there is jointed a pitman 19 which extends down past the fulcrum of the pendulum and is jointed at its lower end to a sleeve 20 slidingly mounted upon the pendulum stem 8. This sleeve has an enlarged lower end portion 21 of double conical form. Normally this sleeve rests upon a shoulder provided by an enlargement 22 of the pendulum stem as clearly shown in Fig. 1, the weight of the sleeve being sufficient to maintain this adjustment as the pendulum swings. The size of the enlarged end portion 21 can of course be proportioned to suit requirements in this regard. Under this normal condition the numeral bar 10 is therefore thrust outwardly and maintained at the limit of its movement toward the upper end of the index hand. This results in displaying the price numerals which should be consulted when the scales are weighing at their lower capacity.

The removable weight 23 is of general cylindrical form radially slotted to embrace the stem of the pendulum and take up a position in axial alinement therewith. The permanent pendulum weight 9 is of disk form horizontally disposed and preferably provided with two upstanding pins, the shorter one 24 of which is designed to engage a socket in the outside of the removable weight as shown in Fig. 2 and the longer one 25 of which is adapted to occupy the radial slot of the removable weight, the latter being thus held against accidental displacement. On each side of the radial slot the removable weight is beveled or rounded off as shown at 26 for engagement with the under-half of the double conical portion 21 of the sleeve 20. The longitudinal dimension of the removable weight is such as to require displacement of the sleeve in order that the said weight may be accommodated upon the permanent weight. As this removable weight is introduced over the permanent weight the beveled or rounded portions 26 act with a camming effect against the conical under-part of the sleeve enlargement 21 thereby thrusting the latter upwardly. The pitman 19 is thus caused to rock the lever 17 and draw down the price numeral bar 10 so that the set of numerals normally displayed will disappear behind the fingers 11 and the other set of numerals will be exposed. Of course when the weight 23 is removed the parts resume their normal position, through the action of gravity. It will thus be seen that the above-described construction is well adapted to thoroughly fulfil the object primarily stated. As the shifting of the bar 10 and connected parts will have the effect of slightly varying the counter-poise of the pivotal structure by which the weighing is done means are provided for preventing any such variation from affecting the absolute accuracy of the indication on the chart. To this end a compensating bar 28 is arranged to slide upon the rear side of the index hand in parallelism with the bar 10 and this compensating bar is connected by a link 29 with the lever 17 on the same side of the latter's pivot as the pitman 19 and thus on the side opposite that where the link 16 connects. Thus the compensating bar always moves in the opposite direction to the price numeral bar 10. It follows that any variation in counterpoise of the pivotal weighing structure due to movement of the latter bar toward the pivot can be compensated for by the movement of the bar 28 away from the pivot or fulcrum.

While as above stated the construction here shown is well adapted to accomplish the object first stated yet it is to be understood that this construction is susceptible of modification within the scope of the invention and hence in claims which follow essential elements are recited without restriction to details of construction.

What is claimed is:

1. In apparatus of the character described, the combination with a pendulum and a removable weight therefor; of an index hand and bar of strip relatively movable and having associated with them two sets of numerals alternately exposable through such relative movement, and means carried by the hand and pendulum and controlled by the removable weight for effecting a relative movement between the index hand and the strip or bar to expose either set of numerals while concealing the other.

2. In apparatus of the character described, the combination with an index hand, pendulum and removable weight; of a shiftable strip or bar on the index hand bearing two sets of numerals adapted to be alternately exposed, and actuating devices for said bar carried by the hand and pendulum and controlled by the removable weight.

3. In apparatus of the character described, the combination with an index hand, pendulum and removable weight; of a shiftable strip or bar on the index hand bearing two sets of numerals adapted to be alternately exposed, a slide-piece on the pendulum controlled by the removable weight, and operative connections between said slide-piece and the shiftable strip or bar.

4. In apparatus of the character described, the combination with an index hand, pendulum and removable weight; of a shiftable strip or bar on the index hand bearing two sets of numerals adapted to be alternately exposed, a sliding collar or sleeve on the pendulum controlled by the removable weight, and operating connections between said sleeve and the shiftable bar.

5. In apparatus of the character described, the combination with an index hand, pendulum and removable weight; of a shiftable strip or bar on the index hand bearing two sets of numerals adapted to be alternately exposed, and a gravity slide-piece on the pendulum operatively connected with the shiftable bar and adapted to be lifted by the removable weight when the latter is applied to the pendulum.

6. In apparatus of the character described, the combination with an index hand, pendulum and removable weight; of a shiftable strip or bar on the index hand bearing two sets of numerals adapted to be alternately exposed, and a gravitating sleeve or collar on the pendulum operatively connected with the shiftable bar and having a tapering end portion adapted to be acted upon by the removable weight to move said sleeve when said weight is applied to the pendulum.

7. In apparatus of the character described, the combination with an index hand, pendulum and removable weight; of a shiftable strip or bar on the index hand bearing two sets of numerals adapted to be alternately exposed, a slide-piece on the pendulum controlled by the removable weight, a pitman connected with said slide-piece, a rock-arm connected with said pitman, and connections between the rock-arm and the shiftable bar.

8. In apparatus of the character described, the combination with an index hand, pendulum and removable weight; of a shiftable strip or bar on the index hand bearing two sets of numerals adapted to be alternately exposed, a sliding collar or sleeve on the pendulum controlled by the removable weight, a pitman connected with said sleeve, a rock-arm connected with said pitman, and connections between the rock-arm and the shiftable bar.

9. In apparatus of the character described, the combination with an index hand, pendulum and removable weight; of a shiftable strip or bar on the index hand bearing two sets of numerals adapted to be alternately exposed, a gravitating sleeve or collar on the pendulum operatively connected with the shiftable bar and having a tapering end portion adapted to be acted upon by the removable weight to move said sleeve when said weight is applied to the pendulum, a pitman connected with said sleeve, a rock-arm connected with said pitman, and connections between the rock-arm and the shiftable bar.

10. In apparatus of the character described, the combination with weighing means having provisions for changing the weighing capacity, and a chart; of an index hand having a series of transverse openings, a strip or bar slidably mounted on said hand and having two sets of numerals alternately arranged and adapted to be alternately exposed through said openings when the strip or bar is shifted, and means for shifting the same as the weighing capacity of the apparatus is changed.

11. In apparatus of the character described, an index hand having a series of fingers with openings between them, a strip or bar slidingly mounted on said hand and having two sets of numerals alternately arranged and adapted to be alternately exposed through said openings when the strip or bar is shifted, and means for shifting the same.

12. In apparatus of the character described, an index hand having a series of transverse openings, a strip or bar slidingly mounted on said hand and having two sets of numerals alternately arranged and adapted to be alternately exposed through the said openings when the strip or bar is shifted, a pendulum compounded with said hand, a slide-piece on said pendulum, a removable weight coöperating with said slide-piece, a rock-arm connected with the numeral bar or strip, and a pitman connecting said arm with the slide-piece on the pendulum.

13. In apparatus of the character described, the combination with a pendulum and index hand, of a longitudinally movable strip or bar mounted on the latter and bearing two sets of numerals adapted to be alternately exposed by longitudinal movement of said bar lengthwise the index arm, a removable pendulum weight, means controlled thereby for determining the position of the numeral bar, and a compensating bar also longitudinally movable on the index hand and operatively connected with said means for determining the position of the numeral bar; substantially as and for the purpose described.

14. In apparatus of the character described, the combination with a pendulum and index hand, of a longitudinally movable strip or bar mounted on the latter and bearing two sets of numerals adapted to be alternately exposed by longitudinal movement of said bar lengthwise the index hand, a compensating bar also longitudinally movable in the index hand, a removable pendulum weight, a slide-piece on the pendulum adapted to be moved by said removable weight when the latter is applied to the pendulum, a pitman connected with said slide-piece, a rocking arm or lever on the index hand connected with said pitman and connected on opposite sides of its pivot with the numeral bar and compensating bar respectively.

15. In computing scales, the combination of a chart having concentric rows of computation numerals, an index hand adapted to sweep over the same and formed with a series of fingers along one edge and openings between them, a strip or bar mounted on the rear side of said index hand to slide longitudinally thereof and bearing two sets of price numerals, those of one set alternating with those of the other and said bar adapted to be shifted from a position where one set of numerals shows through the openings to a position where the other set shows therethrough, a compensating bar also mounted on the index hand to slide longitudinally thereof, a lever pivoted intermediate its ends on the index hand, links connecting the numeral bar and the compensating bar respectively with the said lever on opposite sides of the latter's pivot, a pendulum compounded with the index hand, a sleeve slidably mounted on the pendulum and having a conical enlargement at the lower end, a weight adapted to be removably applied to the pendulum below said sleeve and to lift the latter by action against its conical part, and a pitman connecting the sleeve and the beforementioned lever.

LEWIS C. WETZEL.

Witnesses:
C. DE LONG,
ALLEN DE VILBISS, Jr.

---

It is hereby certified that in Letters Patent No. 938,096, granted October 26, 1909, upon the application of Lewis C. Wetzel, of Toledo, Ohio, for an improvement in "Computing-Scales," an error appears in the printed specification requiring correction as follows: Page 3, line 39, the word "of" should read *or*; and that the said Letters Patent should be read with this correction therein that the same may conform to the record of the case in the Patent Office.

Signed and sealed this 16th day of November, A. D., 1909.

[SEAL.]

E. B. MOORE,
*Commissioner of Patents.*